United States Patent
Gunda et al.

(10) Patent No.: US 11,954,067 B2
(45) Date of Patent: Apr. 9, 2024

(54) SNAPSHOT RETENTION LOCK AT FILE SYSTEM, FILE SET/DIRECTORY LEVEL TO INSTANTLY LOCK ALL FILES

(71) Applicant: Dell Products L.P., Round Rock, TX (US)

(72) Inventors: Kalyan C Gunda, Bangalore (IN); Jagannathdas Rath, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 17/495,325

(22) Filed: Oct. 6, 2021

(65) Prior Publication Data
US 2023/0103474 A1    Apr. 6, 2023

(51) Int. Cl.
G06F 11/14    (2006.01)
G06F 16/11    (2019.01)
(52) U.S. Cl.
CPC ........ *G06F 16/128* (2019.01); *G06F 11/1448* (2013.01); *G06F 16/122* (2019.01)

(58) Field of Classification Search
CPC .... G06F 16/122; G06F 16/125; G06F 16/128; G06F 11/1448
USPC ................................. 707/638, 649; 711/162
See application file for complete search history.

(56) References Cited

U.S. PATENT DOCUMENTS

| | | | |
|---|---|---|---|
| 10,503,610 B1 * | 12/2019 | Shemer | G06F 11/1464 |
| 2022/0138150 A1 * | 5/2022 | Chmiel | G06F 3/065 |
| | | | 707/649 |
| 2022/0229805 A1 * | 7/2022 | Chakeres | G06F 16/27 |

* cited by examiner

*Primary Examiner* — Ilwoo Park
(74) *Attorney, Agent, or Firm* — Staniford Tomita LLP (57) ABSTRACT

A snapshot is taken of at least a portion of a file system having a set of files to retain over a retention duration. The snapshot is taken at a level of the file system or a directory of the file system. A retention lock is applied to the snapshot to block, over the retention duration, operations involving deletion of the snapshot. The retention lock is not applied to the set of files.

20 Claims, 8 Drawing Sheets

SNAPSHOT RETENTION LOCK AT FILE SYSTEM, FILE SET/DIRECTORY LEVEL TO INSTANTLY LOCK ALL FILES

TECHNICAL FIELD

The present invention relates generally to information processing systems, and more particularly to data retention.

BACKGROUND

Data protection for a modern organization often involves a multi-pronged approach. For example, in addition to making backups, an organization may replicate the backups to another location, make additional copies of the backups, provide enhanced security and authorization to access certain storage locations, and so forth. One type of mechanism to help protect data is a retention lock. A retention lock on a file protects the file from modification or deletion for a certain period of time that may be referred to as a retention duration. Retention locking files helps to prevent malicious or accidental deletion of files during the retention period. Thus, even if a malicious actor is able to breach the organization's storage system, the malicious actor will be unable to delete the files. Further, in addition to corporate policies on data retention, there are also governmental rules and regulations requiring that certain files be retained for certain periods of time.

A large organization may have many millions or even hundreds of millions of backups to copy or replicate and retain each day. Making such a large number of copies and retention locking each individual file requires a significant amount of time and compute resources. Indeed, it can take many hours to a full day to complete a retention locking operation.

There is a need for improved systems and techniques of retention locking.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

Figure 1:
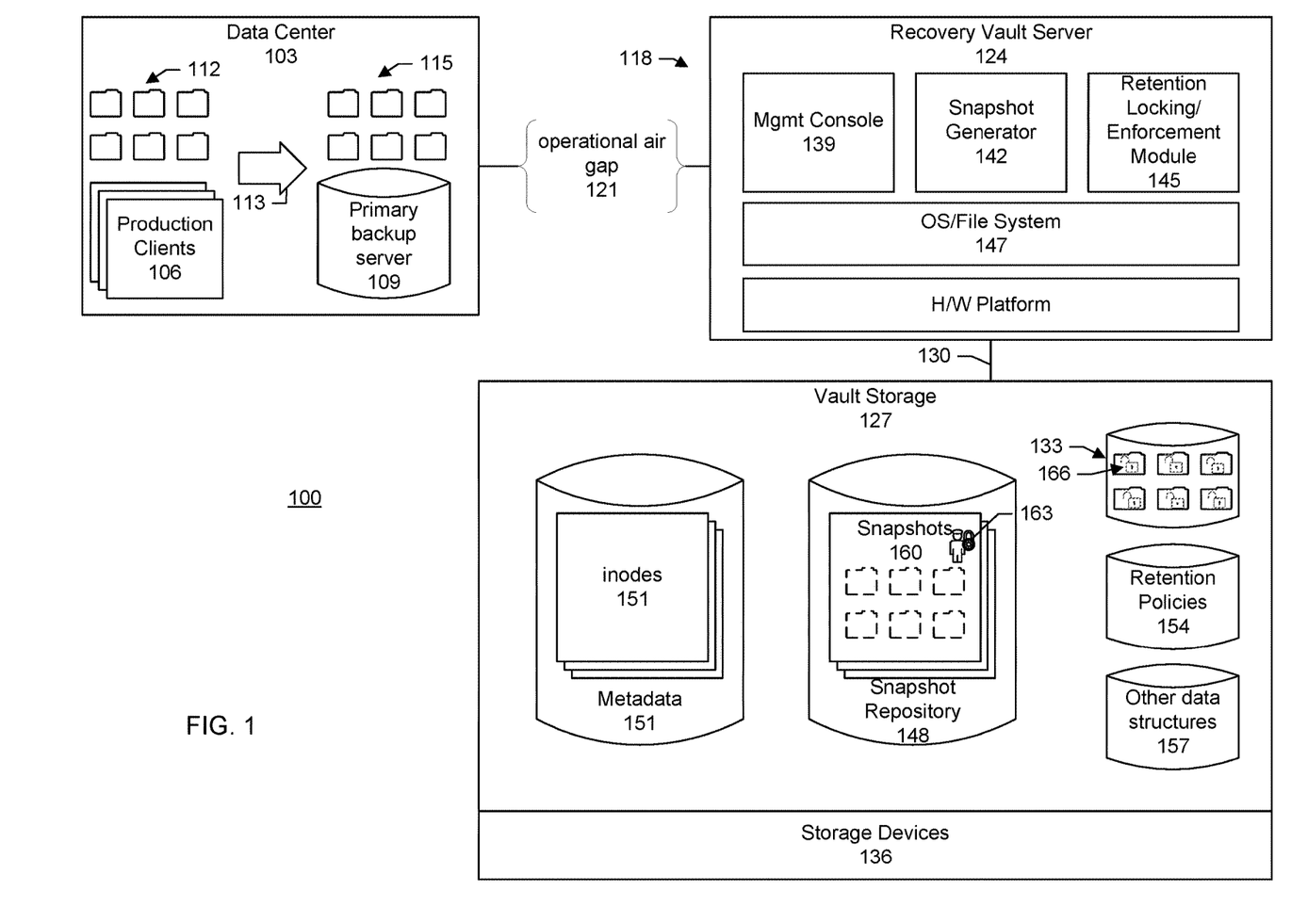
FIG. 1 shows a block diagram of an information processing system comprising a system for snapshot retention locking to instantly retention lock a set of files, according to one or more embodiments.

FIG. 1 shows a simplified block diagram of an information processing system 100 within which methods and systems for retention locking a snapshot of at least a portion of a file system to instantly retention lock multiple files, in effect, may be implemented. The snapshot is taken at the file system, directory, or file set level. A file system-level snapshot may include the entire file system or a subset or portion of the file system including a single file, a single directory, multiple files, or multiple directories. In an embodiment, the files themselves remain unlocked and a retention lock is instead applied to the file system-level snapshot which effectively locks the files as any unwanted changes to the files (including deletions) can be undone via the snapshot. The files are thus indirectly protected via the retention-locked snapshot. The effect of the retention-locked snapshot is equivalent to applying retention locks to each of the individual files. The snapshot can be mounted and browsed to identify files subject to retention locking and associated retention lock durations, lock expiration dates, and other file attributes. In an embodiment, retention locking is provided as part of a backup system and, in particular, in connection with copying, cloning, or replicating backup data stored on a primary backup server to an alternate location and retention locking data at the alternate location.

Ransomware and cyber-attacks have become very common today with many datacenters and customer IT infrastructure and backup infrastructure being attacked and wiped out completely, leaving nothing to restore.

This has led to the evolution of many different protection mechanisms to counter these attacks, such as cyber recovery solutions, ransomware protection solutions, and so forth. Most of these solutions utilize technologies such as replication, retention locking and air-gapped vault backup servers to store additional locked data, not easily accessible to outside world.

One such example is Dell Cyber Recovery Solution (CRS) as provided by Dell Products L.P. of Round Rock, Texas In the CRS system, data from a primary backup server is frequently replicated to a different vault backup server. This vault is air-gapped, which closes to provide access to the vault only when replication happens, thereby protecting the vault from any other outside access. As another layer of security in the vault, the replicated data is retention locked for a certain duration to prevent it from destruction in case attackers gain access to the vault.

Another example is, in primary backup servers, protecting the data by retention locking each file for a certain duration so that attackers cannot wipe out those files, even if they gain access to it.

In yet another example, the replicated data in vaults (which is mostly read-only) is copied first to a different location (within the system) and then retention locked. This mode of operation generally involves making a copy of the data. The copy maker can use any form of efficient copy supported by underlying storage/file system. On a storage system, such as Data Domain as provided by Dell Technologies, there can be a referenced-based copy that may be referred to as a "fastcopy." In a referenced-based or fastcopy, the actual data is not copied to the destination. However, all other references, inode, metadata, and so forth are copied as new files and inodes in the destination. Performing referenced-based copy of each file is much faster than reading actual file content from the source and writing the actual file content to the destination files as the operation only involves manipulation of file metadata and no physical backup data is read/written to disk. Such sets may be created daily and kept for 'n' days based on configurable customer protection policies.

In production environments, there can be many millions of files to be protected daily. Some environments can even have numbers into the hundreds of millions of files (new or modified). The files on storage will increase based on the type of workloads and retention policies. Retention locking such huge vast number of files poses a severe challenge to these protection solutions impacting overall recovery point objective (RPO) in terms of protection and validation of data to make sure that the data is protected against malware.

In particular, retention locking tens to hundreds of millions of files daily requires a significant amount of time (many hours to a full day), as each file has to be locked individually. Fastcopy or referenced-based copy techniques must be completed before locking which can aggravate the time problem. Even though fastcopy is reference based, it still requires a large amount of time to fastcopy and retention lock all the fast-copied files as the fastcopy process requires performing many inode operations each for fastcopy and locking.

Further, each set of such fast-copied files consumes a good amount of storage. Also, they consume a good amount of available inodes in a system (which is always fixed). That is, in Linux or Linux-based file systems, there are a limited number of inodes. Although the number of inodes can extend into the billions, imagine a customer keeping each copy of a file for say 90 days. If the file system has 100 million files, then the total number of files will be 90×100 million+base files for a total of nearly 9 billion files. This results in storage overheads and other side effects to the various functions of the file system.

A problem with block/disk level snapshots is that they cannot expose files in the file system/directories for further analysis or use. Files and directories cannot be accessed using block/disk-level snapshots.

Creating snapshots for the entire file system, or a portion of the file system, e.g., directory-level snapshots, can help to preserve a read-only copy of the files at that particular point in time, but the snapshots are themselves vulnerable to being deleted by attackers and in turn deleting the entire collection of files.

An automatic retention locking (ARL) feature can provide for locking files automatically once ingested/created or fastcopied—needing no further manual locking on each of them. This can save a great amount of time. Generally, however, ARL works closely with the last modified time (mtime) of the file and files are considered locked when there are no writes for a certain period of time (cooling period), identified on the basis of mtime. If the data protection solution depends on this mtime value to be preserved, then ARL cannot be used in those scenarios, as the mtime is updated to new latest time. ARL having new mtime is a fundamental requirement for ARL and keeping it same/preserving it goes against locking semantics as files will not get locked correctly as intended.

In an embodiment, systems and techniques provide an efficient method of retention lock protection for millions of files instantly while consuming a fraction of the storage space as compared to traditional approaches. The use of file system-level snapshots helps to avoid making copies and can provide an increase in efficiency in terms of storage and performance. A snapshot is immutable by nature, yet at the same time snapshots can be deleted thus offering no protection against hackers and rogue or careless administrators.

In an embodiment, systems and techniques provide retention locking of file system-level or directory-level snapshots. When a snapshot is created for a file system the snapshot may be assigned an expiration date or duration such as one month or 1 year, beyond which they expire and can be cleaned up by garbage collectors or manually deleted. In an embodiment, directory-level snapshots are similar to file system snapshots, except they are subsets of the file system and start from a particular directory. In an embodiment, systems and techniques provide an ability to retention lock file system and directory-level snapshots by associating them with a retention lock duration and enforcing the restrictions for destructive operations during that period. The technique can be applied to both file system-level and directory-level snapshots, depending on what applications and backup servers provide.

In the example shown in FIG. 1 there is a data center 103 having production clients 106 connected via a network to a primary backup server 109. Data 112 of the production clients is backed up 113 over the network to the backup server where the backed up data resides as a primary backup 115. The data may include a complete file system, portions of a file system (e.g., one or more directories), sets of files, or other units of data generated by the production clients. The backup server is connected to a recovery vault system 118 via an automated operational air gap 121. The recovery vault system includes a vault server 124 connected to vault storage 127 via an interconnect 130. The interconnect may include a bus, a connection over a network such as a storage area network (SAN), or any other connection scheme to communicatively connect to the storage system.

In an embodiment, data from the backup server is periodically synchronized to vault storage and maintained as synchronized or replicated backup 133. The vault storage may include a system of storage devices 136. The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage system may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the storage system may represent logical storage that includes any number of physical storage devices connected to form a logical storage.

The vault system offers multiple layers of protection to provide resilience against cyber attacks including insider threats. In an embodiment, the vault is designed to be physically isolated within a protected part of the data center and requires separate security credentials and multi-factor authentication for access. The automated operational air gap provides network isolation and closing of the air gap is restricted to periods of synchronization with the primary backup server. In other words, when the air gap is closed, the vault can be accessed; and when the air gap is open, the vault is cut-off from access.

In an embodiment, the recovery vault server includes a management console 139, snapshot generator 142, and snapshot retention locking/enforcement module 145. A file system/OS 147 of the recovery server provides organization and access to the data stored in vault storage. One or more components such as the enforcement module may operate at a file system level of the recovery vault server in order to block or allow operations involving retention locked snapshots. Vault storage includes a snapshot repository 148, metadata 151, retention policies 154, and other data structures 157.

The management console provides a user interface to the recovery vault. An administrator may use the management console to configure the vault such as authoring retention policies including configuring retention duration, identifying data including an entire file system or particular directories or other file sets within the file system that should be subject to retention locking, browsing retention-locked file sets, modifying or overriding default retention durations and expiration dates, and so forth.

The snapshot generator is responsible for generating commands to a snapshot service to request the creation of snapshots. The snapshot service may be provided, for example, by a separate application or backup server. As discussed, the snapshots are taken at the file system-level and may include the entire file system or a subset of the file system, e.g., one or more directories depending on the snapshot service that is provided.

Figure 2:
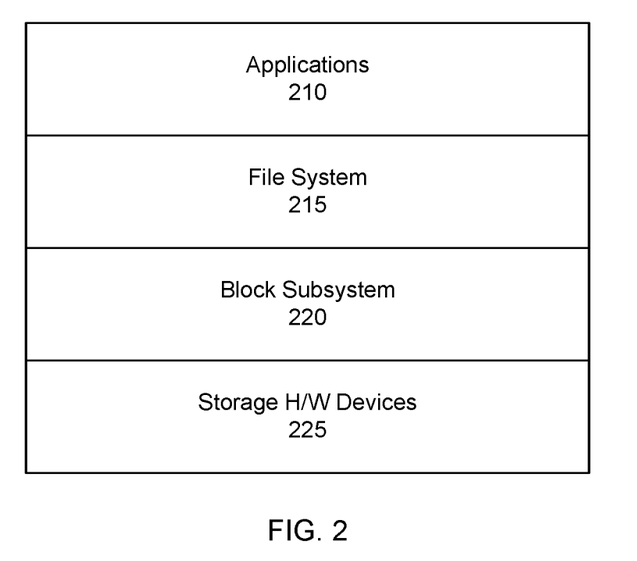
FIG. 2 shows a layer diagram of a storage stack illustrating a level at which a file system operates and snapshot may be taken, according to one or more embodiments.

FIG. 2 shows a layer diagram of a storage or protocol stack illustrating a level at which a file system operates. Layers in the layer diagram include an application layer 210, file system layer 215, block subsystem layer 220, and storage hardware layer 225. In order to access data stored in the storage layer, applications generate requests that are passed down the stack. The applications are considered to reside at the top of the storage stack. Thus, the requests are passed down from the applications to the file system and to the block subsystem. The data is retrieved from the storage layer and the data begins its journey back up the stack to the file system and ultimately to the requesting application.

Each layer is responsible for a set of processing and packaging operations before handing off to a next layer. Each layer moving away from the storage layer provides an increasing level of abstraction. In particular, the applications read and write data in files. The file system layer is between the application and block subsystem layers. The file system layer is above the block subsystem layer and thus provides a level of abstraction over the block layer and the hardware responsible for storing and retrieving specified blocks of data.

The file system organizes the data into files and folders (or directories) into which the files may be stored. When an application requests access to a file, the file system issues a file handle or other identifier for the file to the application. The application can use the file handle or other identifier in subsequent operations involving the file. A namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

The file system keeps track of which blocks of the underlying block device belong to which files and translates these file reads and writes into block reads and writes that are passed to the block subsystem. The block subsystem, in turn, passes the reads and writes to the underlying hardware layer using the appropriate device drivers to read and write the relevant blocks to the storage devices.

Taking snapshots at the file system layer allows for exposing the files organized by the file system to the user. Snapshots are an instantaneous or near-instantaneous virtual copy of the file system (or portion of the file system) as it appeared at a specific point in time when the snapshot was created. Snapshots can be created very quickly because they are virtual copies of files in the file system rather than actual copies. There are many different techniques to create snapshots such as copy-on-write and others. Taking a snapshot can be likened to placing a bookmark in the file system. Once the bookmark has been placed, subsequent changes to files in the file system may be made in a separate journal or storage area while the original data as of the bookmark are maintained. Writes issued to a file system after a snapshot of the file system has been taken may be performed in conjunction with triggering a copying of original data in the file system to the snapshot. References may be generated and stored in the snapshot that point to the original data. Since a snapshot provides for the preservation of the original data, the snapshot allows for reverting any changes to the file system back to a state of the file system as it existed at the time the snapshot was taken. A snapshot may be referred to as a file system-level snapshot, directory-level snapshot, or fileset-level snapshot.

Referring back now to FIG. 1, these file system or directory-level snapshots 160 are stored in the snapshot repository. Broken lines in the snapshots are used to indicate that the corresponding files are virtual copies. The retention locking module is responsible for applying retention locks 163 to the snapshots and enforcing the retention locks over a period of a retention duration. Enforcement may include, for example, blocking operations to delete or modify the snapshots.

Retention locks, however, are not applied to the files of file system snapshot themselves. That is, the files remain unlocked 166 over the retention duration. If a rogue actor manages to access the unlocked files during the retention duration, the rogue actor may be able to delete and make changes to the files. The existence of the snapshots, however, allow for reverting or undoing such deletions and changes to the file system. The snapshots themselves are protected from changes and deletions because they are retention locked. The files are in effect retention locked via the snapshot and without having to undertake compute and resource intensive operations to make what can be many millions of copies and apply retention locks to each copy.

Metadata may include file system namespace and file trees defining a hierarchal structure of directory or reference levels to map and organize files in the file system to segments making up the file. In other words, a portion of the metadata may define an organizational and hierarchal tree structure of files and directories. The tree structure can be traversed up and down to locate entities (e.g., files or directories) organized by the tree. In an embodiment, the file system of the vault server is a deduplicated file system.

In an embodiment, the metadata includes inode or other data structures storing metadata. An inode is a type of data structure that stores information about a file. When a file is created it is assigned a name and an inode is allocated for the file. The inode is identified by an inode number that is unique within the file system. File names and their corresponding inode numbers are stored as entries in a directory. The inode stores metadata for the file. Metadata attributes of an inode may include the inode number, file owner, file type (e.g., regular file or directory), file size, file modification time (e.g., mtime), file creation time, access permissions, address/length pairs pointing to extents where file data content resides, file listings (as in the case of a directory inode), and other attributes.

Every file and directory in a file system, including a snapshot file, has an inode storing metadata. The metadata may be made available to the applications, kernel, or other file or operating system utilities and processes. When, for example, an application refers to a file by name, the operating system uses that name to look up the corresponding inode, which then enables the system to obtain the information it needs about the file to perform further operations. The file system and other processes use the information in an inode to locate a file associated with the inode and determine what operations may be carried out on the file.

Figure 3:
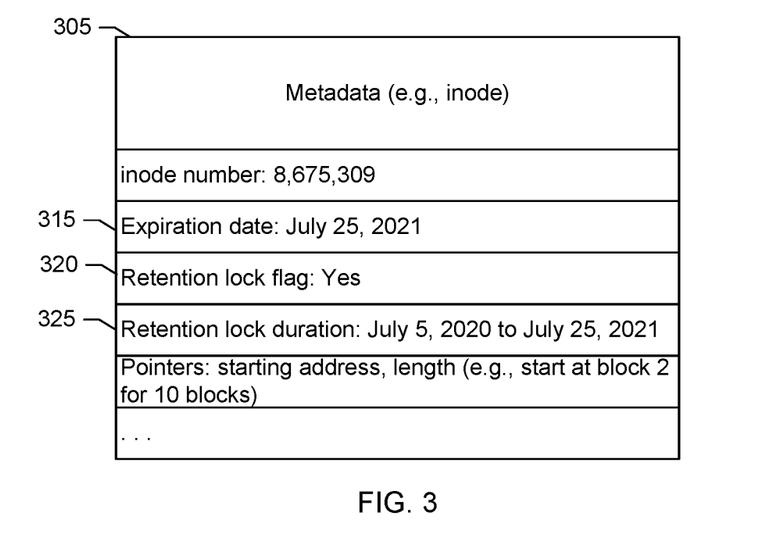
FIG. 3 shows an example of an inode data structure, according to one or more embodiments.

An inode may be allocated when a snapshot is taken. The inode stores metadata associated with the snapshot. Snapshot metadata for a snapshot may include, for example, directory inode information of the corresponding directory that was snapshotted, inode number and generation number of the directory, file system identification, timestamp, and other attributes. It should be appreciated that an inode is merely an example of a specific data structure for storing metadata. In other implementations, other similar and equivalent data structures may be used or substituted in place of what is shown. Snapshot metadata need not be stored in an inode. Snapshot metadata may be stored anywhere. For example, the backup server, rather than creating an inode for a snapshot, may maintain a list of its own data structures to represent snapshots. FIG. 3 shows a block diagram of some attributes that may be stored in an inode or other data structure 305. As shown in the example of FIG. 3, attributes of an inode for a snapshot may include an expiration date 315, retention lock flag 320, and retention lock duration 325.

The expiration date stores a date at which the associated snapshot can be considered to have expired (and thus allowed to be deleted). The retention lock flag identifies the associated snapshot as being (or not being) retention locked. The expiration date thus defines a retention lock duration or time period during which the associated snapshot should be locked and thus operations to delete the snapshot blocked. A retention lock duration attribute may optionally be provided to store a specification of the time period. A snapshot can thus be retention locked by setting a retention lock flag and other retention lock attributes in an inode associated with the snapshot. File system processes of the vault server can examine the snapshot metadata to determine whether operations involving the corresponding snapshot should be allowed or denied. For example, a request to delete a file system snapshot whose metadata indicates that the retention lock flag has been set may be denied.

Alternatively or additionally, at least a subset of attributes of a snapshot may be cataloged into a database. For example, the database may contain a timestamp indicating the time and date the snapshot was taken, identification of a directory corresponding to the snapshot, path information to the directory, retention lock flag, snapshot expiration date, retention expiration date, retention duration, a listing of files contained in the directory, directory inode information identifying a directory to which the snapshot belongs, and other attributes. In an embodiment, an administrative user via the management console can access the database to view a listing of cataloged snapshots that have been retention locked, corresponding files, and other details.

Figure 4:
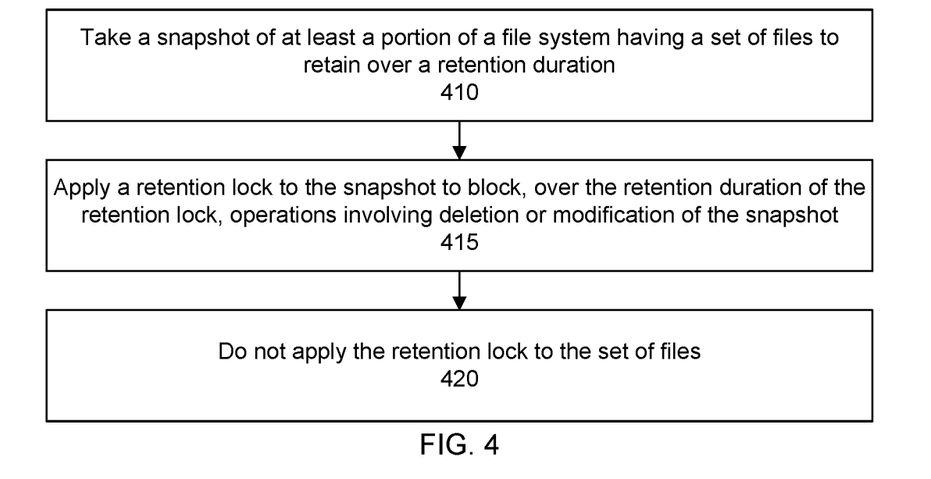
FIG. 4 shows an overall flow to effectively retention lock a set of files instantly, according to one or more embodiments.

FIG. 4 shows a flow for effectively retention locking all or a subset of files of a file system instantly or near instantly. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 410, a snapshot is taken of at least a portion of a file system having a set of files to retain over a retention duration. As discussed, in an embodiment, the snapshot is at the file system or directory level and may include the entire file system or a subset of one or more directories or files of the file system. In a step 415, a retention lock is applied to the snapshot to block, over the retention duration of the retention lock, operations involving deletion or modification of the snapshot. In a step 420, the retention lock is not applied to the set of files.

That is, compute resources and time do not have to be expended to apply retention locks to each of the individual files. Nonetheless, the technique of retention locking the snapshot enables the files to be effectively retention locked; and retention locked instantaneously or near-instantaneously because snapshots can be created very quickly. The snapshot is retention locked thus helping to ensure the preservation of original file data. Any changes or deletions to the files can be undone by mounting and accessing the snapshot to undo such changes or deletions. The retention-locked snapshot can function as a proxy to provide indirect protection to the files equivalent to applying retention locks to each of the individual files.

In other words, snapshots—which are taken at the file system-level, fileset-level, or directory-level—are locked. In cases where there is an expiry date already defined it can be reused based on semantics. Both snapshot expiry and lock time attributes may co-exist together with respective semantics where lock time takes precedence and expiry date is rendered invalid when lock time exists or when the snapshot is locked. The snapshot is protected from deletions and modification until the end of the lock expiry time.

In an embodiment, retention locking a snapshot takes an additional optional "lock expiry date" value, which when provided updates the snapshot expiry date further to that value. This can be helpful in scenarios where users want to lock the snapshot for a longer duration than the currently set snapshot expiry date. If this value is not provided then the lock remains in effect until the currently set snapshot expiry date.

For example, some snapshot services may automatically tag a snapshot with a default expiration date. The default expiration date may be based on a user configurable snapshot policy. The expiration date, however, may not necessarily operate to retention lock the snapshot to prevent a malicious actor from deleting the snapshot before the expiration date. In an embodiment, the default expiration date is used to set a duration of the retention lock on the snapshot. That is, in an embodiment in a snapshot retention-locked enabled system, a default expiration date of a snapshot is used to set the retention lock duration thereby preventing the malicious actor from deleting the snapshot during the retention lock duration. A user administrator, however, may use the management console to configure a retention lock duration that is different from the default snapshot expiration date. In such a case, the retention lock duration takes precedence.

When a lock is issued on a file system or directory snapshot, the snapshot's metadata is updated to store a flag indicating that the snapshot is retention locked, e.g., SNAP_IS_RETENTION_LOCKED (0X0000040000). In some cases, there can be a retention lock expiry date of the snapshot available in the snapshot's metadata structures. If not, the expiry date will also be stored in the snapshot metadata. In an embodiment, the date is stored as a future EPOCH time value in seconds, e.g., int64_t snap_expiry_secs. Both the flag as well as expiry date may be persisted on-disk as well as in available in-memory for faster access.

For directory-level snapshots, the snapshot metadata additionally stores the directory inode information such as inode number, generation number, file system ID, and so forth to easily identify which directory the snapshot belongs to.

Figure 5:
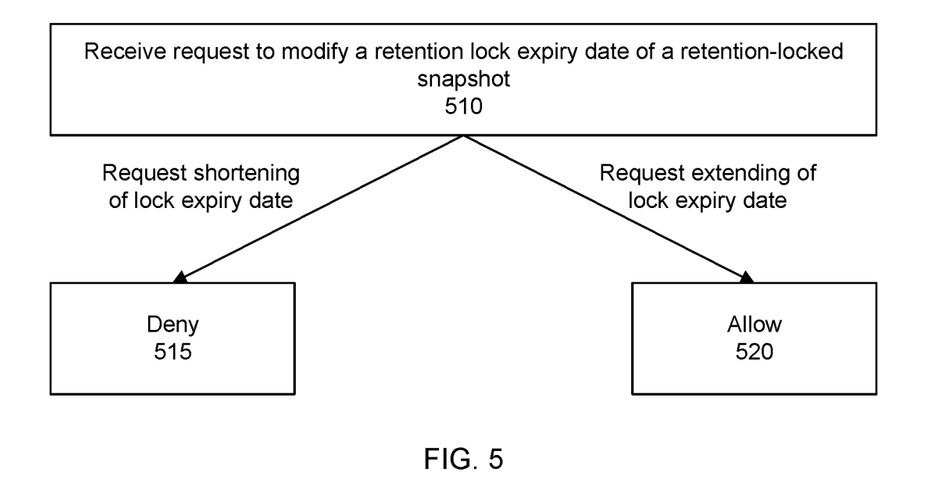
FIG. 5 shows a flow for changing a retention lock expiry date of a snapshot, according to one or more embodiments.

The retention locking and enforcement module includes rules and logic to manage and handle operations involving retention-locked snapshots. FIG. 5 shows a flow for handling requests to modify retention lock expiry dates. In a step 510, a request is received to modify a retention locked expiry date of a snapshot having a retention lock. If the request is to shorten the retention lock expiry date, the request is denied (step 515). If the request is to extend the retention lock expiry date, the request is allowed (step 520).

That is, in an embodiment, the retention lock expiry date for locked snapshots can always be extended further in cases where the snapshot is still locked and yet-to-expire or the snapshot lock has already expired. The retention lock expiry date for locked snapshots, however, can never be shortened. The locked snapshots can only be expired and deleted once their retention lock duration completes. Once the retention lock duration has elapsed, the corresponding snapshots may be deleted automatically by garbage collector processes or be manually deleted. Attempts to manually expire/delete locked snapshots are failed with appropriate errors returned to the user.

Further, any of the system's destructive commands will fail if there are any locked snapshots. For example, a file system destroy operation will fail as long as there are one or more locked file system or directory snapshots in the system. As another example, any modules in the system which have the capability to delete or modify snapshots include checks to determine if a snapshot is locked or not before carrying out the operation. Such operations may proceed only if the snapshots are not locked or the retention lock has expired. As discussed, the retention lock status and other retention lock attributes of a snapshot may be determined by reviewing snapshot metadata stored in a corresponding inode or other data structure associated with the snapshot.

Figure 6:
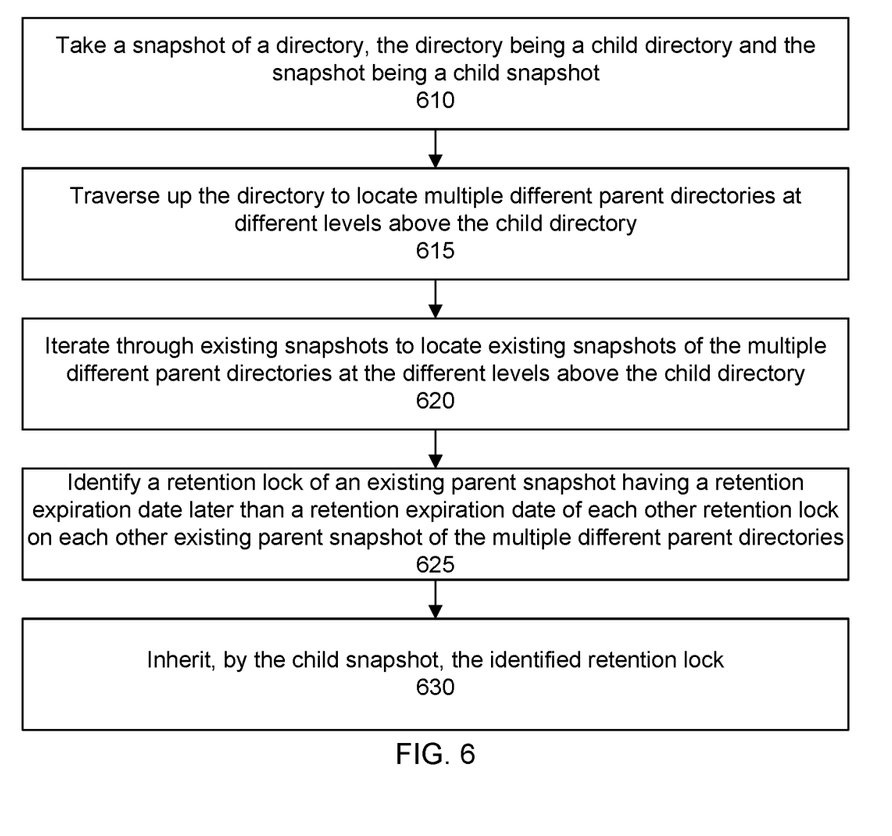
FIG. 6 shows a flow for retention lock inheritance, according to one or more embodiments.

FIG. 6 shows a flow for handling retention locks for multiple directory-level snapshots in the same subtree hierarchy. In other words, the flow shown in FIG. 6 can be used to manage cases where there are multiple different parent directories at different levels above a particular directory (e.g., child directory) and a snapshot has been taken of each of the multiple different parent directories. With directory-level snapshots, there can be scenarios where a snapshot is taken for a particular directory (e.g., directory1 or parent directory) and then later a snapshot is taken for a child directory (e.g., directory2, which is under directory1, e.g., one or more levels down or below the parent directory). In an embodiment, if one or more snapshots already exists for one or more of a child's parent directories, then the child directory snapshot inherits the retention lock attribute of its parent's snapshots. Further, there may be multiple snapshots in the whole directory hierarchy, e.g., a snapshot in each level. So, the effective retention lock duration in such a case is the maximum lock duration among all snapshots of all parents above the directory.

More particularly, in a step 610 a snapshot of a directory is taken, the directory being a child directory and the snapshot being a child snapshot. In a step 615, the directory is traversed up to locate multiple different parent directories at different levels above the child directory. In a step 620, the existing snapshots are iterated to locate existing snapshots of the multiple different parent directories at the different levels above the child directory. In a step 625, an identification is made of a retention lock of an existing parent snapshot having a retention expiration date later than a retention expiration date of each other retention lock on each other existing parent snapshot of the multiple different parent directories. In a step 630, the child snapshot inherits the identified retention lock. That is, retention lock attributes from an inode of the identified existing parent snapshot may be copied into an inode of the child snapshot (or other snapshot metadata of the child snapshot).

For example, consider that there is a first file system-level snapshot of a first directory of a file system. A retention lock has been applied to the first file system-level snapshot. Afterwards, a second file system-level snapshot of a second directory of the file system is taken. The second directory is a child directory of the first directory. The second file system-level snapshot, e.g., child snapshot, will inherit the retention lock applied to the first file system-level snapshot, e.g., parent snapshot.

As another example, consider that there is a first file system-level snapshot of a first directory of the file system. A retention lock has been applied to the first file system-level snapshot. A second file system-level snapshot of a second directory has been taken. The second directory is a parent directory of the first directory. Thereafter, a third file system-level snapshot of a third directory of the file system is taken. The third directory is a child directory of the first directory. In this scenario, the third file system-level snapshot inherits a retention lock of one of the first or second file system-level snapshots. The inherited retention lock has a retention duration greater than a retention duration of another of the first or second file system-level snapshots. Identifying the retention lock having the greatest retention duration may be performed by iterating through metadata structures (e.g., inodes) of the snapshots and comparing the retention durations that have been set and stored in the metadata structures.

In an embodiment, there is another rule that specifies a parent directory snapshot cannot be deleted if there are one or more child directory snapshots still locked. An algorithm, while doing a lookup of a snapshot's parents, for each parent encountered, the algorithm can quickly iterate the existing snapshots to check if a snapshot exists for it by matching the inode details of the parent directory and the one stored in the snapshot metadata.

Figure 7:
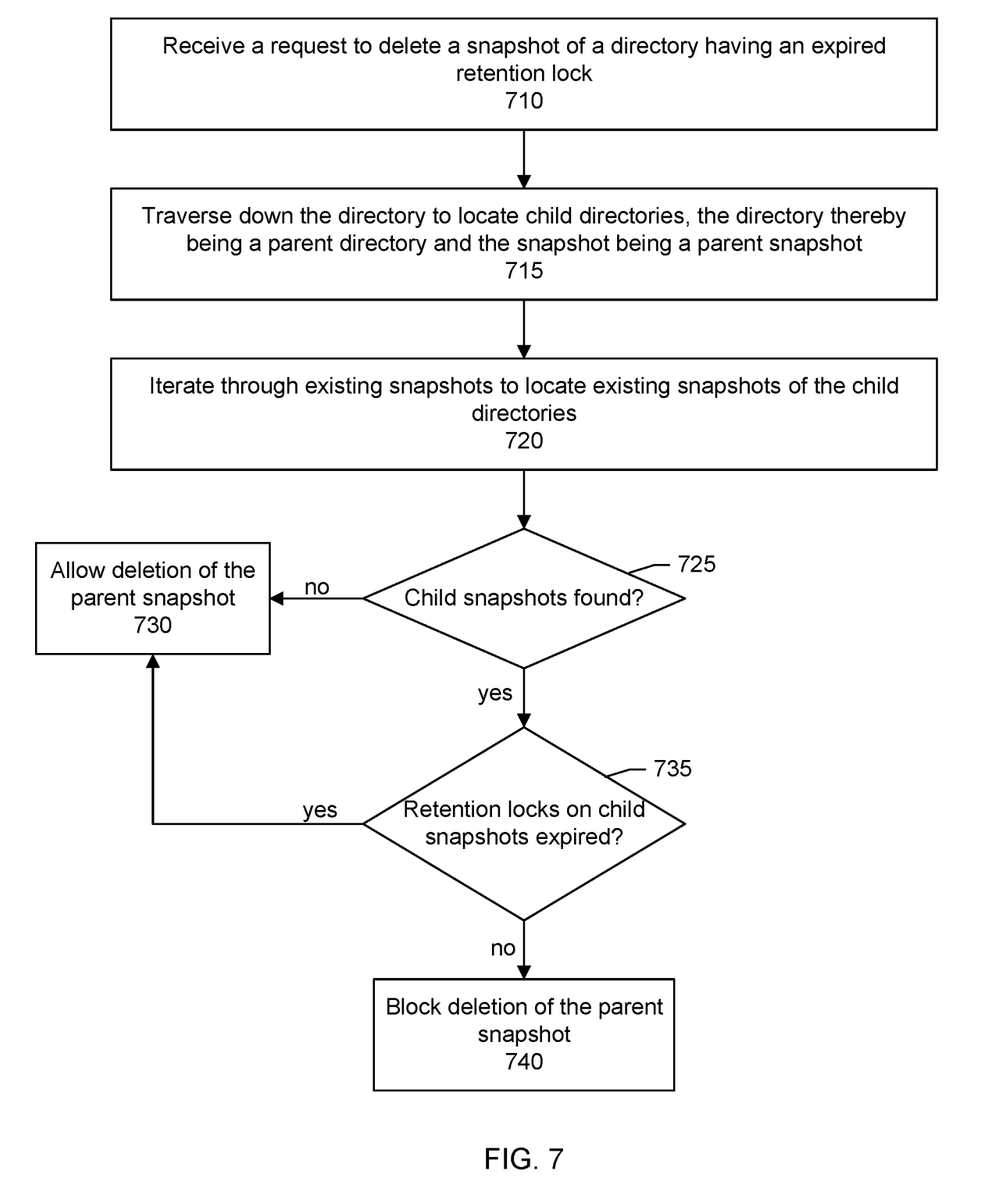
FIG. 7 shows a flow for deleting a snapshot, according to one or more embodiments.

More particularly, in a step 710, a request is received to delete a snapshot of a directory having an expired retention lock. In a step 715, the directory is traversed down to locate child directories, the directory thereby being a parent directory and the snapshot being a parent snapshot. In a step 720, existing snapshots are iterated to locate existing snapshots of the child directories. In a step 725, a determination is made as to whether child snapshots have been found. If no child snapshots have been found for the parent snapshot, the parent snapshot is allowed to be deleted (step 730). If child snapshots have been found, a determination is made as to whether retention locks on each of the child snapshots have expired (step 735). If the retention locks on each of the child snapshots have expired, the parent snapshot is allowed to be deleted (step 730). Alternatively, if there is at least one child snapshot having a retention lock that has not expired, the deletion of the parent snapshot is blocked (step 740).

As an example, consider that there is a first file system-level snapshot of a first directory of the file system. After a retention lock of the first file system-level snapshot has expired, a request is received to delete the first file system-level snapshot. A determination is made that there exists a second file system-level snapshot of a second directory of the file system. The second directory is a child directory of the first directory. The second file system-level snapshot has a retention lock that has not expired. In this scenario, the request to delete the first file system-level snapshot is blocked.

In another scenario, there can be multiple snapshots taken for one of the parent directories. In that case as well, the child directory snapshot inherits the maximum retention expiry among all the snapshots. As an example, consider that a single directory N has had three snapshots taken. A first snapshot is locked from Jul. 1, 2020 to Jul. 15, 2021. A second snapshot is locked from Jul. 5, 2020 to Jul. 25, 2021. A third snapshot is locked from Jul. 10, 2020 to Jul. 17, 2021. In this example, a child directory snapshot taken of a child directory in directory N inherits the lock until Jul. 25, 2021. That is, retention lock attributes of the third snapshot may be copied into corresponding inode fields of the child directory snapshot.

Figure 8:
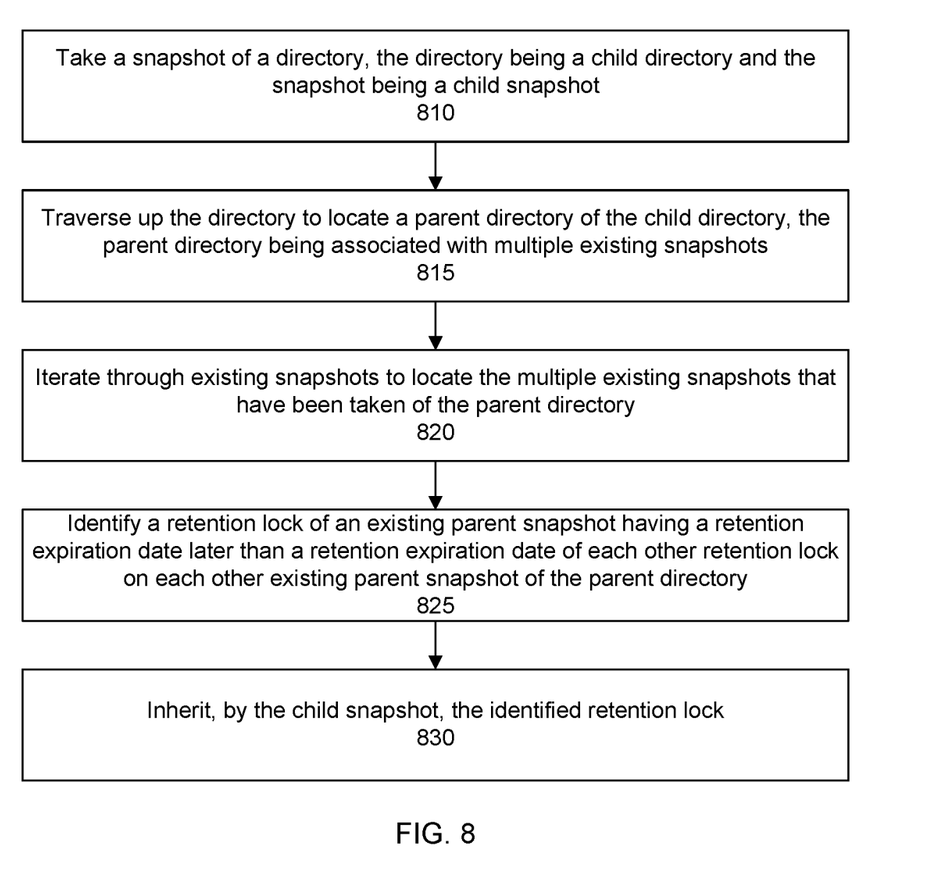
FIG. 8 shows another flow for retention lock inheritance, according to one or more embodiments.

FIG. 8 shows another flow for retention lock inheritance. The flow shown in FIG. 8 is similar to the flow shown in FIG. 6. The flow shown in FIG. 6 can be used to handle the case in which there are multiple different parent directories at different levels above a child directory and each different parent directory has an existing snapshot. The flow shown FIG. 8, however, can be used to handle the case in which there are multiple existing snapshots of a parent directory.

In particular, in a step 810, a snapshot of a directory is taken, the directory being a child directory and the snapshot being a child snapshot. In a step 815, the directory is traversed up to locate a parent directory of the child directory, the parent directory being associated with multiple existing snapshots. In a step 820, existing snapshots are iterated to locate the multiple existing snapshots that have been taken of the parent directory. In a step 825, an identification is made of a retention lock of an existing parent snapshot having a retention expiration date later than a retention expiration date of each other retention lock on each other existing parent snapshot of the parent directory. The identification may be made by iterating through the inode or other metadata structures of the existing snapshots and comparing retention expiration dates. In a step 830, the child snapshot inherits the identified retention lock. In other words, an inode or other metadata structure of the child snapshot may be updated with retention lock attributes of the existing parent snapshot.

As an example, consider that there is a first file system-level snapshot of a first directory. A first retention lock has been applied to the first file system-level snapshot. A second file system-level snapshot of the first directory is taken and a second retention lock has been applied to the second file system-level snapshot. Thereafter, a third file system-level snapshot of a second directory of the file system is taken. The second directory is a child directory of the first directory. The third file system-level snapshot inherits a retention lock of one of the first or second file system-level snapshots. The inherited retention lock having a retention expiration date later than a retention expiration date of another of the first or second file system-level snapshots.

Below are some benefits of retention locking files via snapshots:

1. Using a snapshot preserves the exact state and attributes of the files. There is no chance of any change in the attributes.
2. Relieves the system of inode pressure which would otherwise occur using copy-type solutions.
3. The snapshot remains locked and therefore cannot be deleted by anyone until the retention lock expires. Snapshot retention locking provides the equivalent of locking individual files but is accomplished in an instant as compared to the hours it would have taken to lock individual files.
4. Enables faster RPO and recovery mechanism in the overall solution.
5. The space utilization of a snapshot is much less as compared to approaches such as referenced-based copying (e.g., fastcopy) or full copying of the whole data set.
6. Does not cause the number of inodes to increase exponentially and render the file system full, even if hundreds of snapshots are created—which would otherwise occur using a copy mechanism instead.
7. Cleaning up each snapshot is instantaneous or near instantaneous as compared to the many minutes or hours it would have taken to delete millions of individual files (in case of full copy or fastcopy).

Referring back now to FIG. 1, the locked snapshot mechanism can be used to effectively lock millions of files instantly. In an embodiment, a workflow of the locked snapshot mechanism is applied to a Dell Cyber Recovery Solution (CRS) type of environments involving air-gapped vaults, where data from a production system flows into the vault periodically via replication.

In the vault, the latest replicated data set is copied into another location within the vault and then retention locked for a certain duration, such as 1 week or for any other period of time as desired. Expired set of files are cleaned up regularly. Making a copy of millions of files, locking each of them, and also cleaning up millions of files, are all heavy time consuming operations (may take many hours as well for millions of files).

With locked snapshots, however, effectively retention locking many millions of files can be accomplished by creating a snapshot for the whole file system or directory which holds the replicated data and then locking the snapshot for the required protection duration.

This can require merely a few seconds rather than the hours needed for copy based solutions and can be carried out periodically as required. The length of the lock duration can be user-configured (e.g., 1 week), after which the expired snapshots can be cleaned up such as via garbage collection process or manual deletion. As discussed, retention locking snapshots is equivalent to locking each of the millions of files individually, but done in an instant. Further, cleaning up the expired snapshots is like deleting a directory with millions of files, but again done instantly or near instantly.

As discussed, snapshots can also be mounted to expose the file system to applications. This can be utilized to check or compare or analyze the data seamlessly. Many snapshot implementations or snapshot services further include snapshot differing mechanisms to quickly identify the differences between two snapshots. This also can be utilized to compare and differentiate the content between two snapshots very easily.

The snapshot remains locked and therefore cannot be deleted by anyone until the retention lock expires. The locked snapshot, in effect, locks individual files but is accomplished in an instant as compared to the hours it would have taken to lock individual files. This enables a faster RPO and recovery mechanism. The space utilization of a snapshot is much less as compared to methods such as fastcopy or full copy of the whole data set. Retention-locked snapshots does not cause the number of inodes to increase exponentially and render the file system full, even if hundreds of snapshots are created—which would have occurred if a copy mechanism was used instead Cleaning up each snapshot is also instantaneous as compared to the many minutes or hours it would have taken to delete millions of individual files (in case of full copy or fast copy). Techniques of snapshot retention locking as described are equally applicable to deduplication and non-deduplication systems, backup servers, backup applications, primary storage and the like. In an embodiment, snapshot retention locking applies to systems supporting directory level snapshots.

In an embodiment, there is a method of indirectly protecting files comprising: taking a snapshot of at least a portion of a file system comprising a plurality of files to retain over a retention duration, the snapshot being at a level of the file system or a directory of the file system; applying a retention lock to the snapshot to block, over the retention duration, operations involving deletion of the snapshot; and not applying the retention lock to the plurality of files. The method may include indirectly protecting the plurality of files equivalent to applying retention lock to plurality of files.

In another embodiment, the snapshot is a first snapshot, is of a first directory of the file system, and the method further comprises: taking a second snapshot of a second directory of the file system, the second directory being a child directory of the first directory; and inheriting, by the second snapshot, the retention lock applied to the first snapshot.

In another embodiment, the snapshot is a first snapshot, is of a first directory of the file system, the retention lock is a first retention lock, and the method further comprises: taking a second snapshot of a second directory of the filesystem, the second directory being a parent directory of the first directory; applying a second retention lock to the second snapshot; taking a third snapshot of a third directory of the file system, the third directory being a child directory of the first directory; and inheriting, by the third snapshot, a retention lock applied to one of the first or second snapshots, the inherited retention lock having a retention duration greater than a retention duration of another of the first or second snapshots.

In another embodiment, the snapshot is a first snapshot, is of a first directory of the file system, the retention lock is a first retention lock, and the method further comprises: taking a second snapshot of the first directory; applying a second retention lock to the second snapshot; taking a third snapshot of a second directory of the file system, the second directory being a child directory of the first directory; and inheriting, by the third snapshot, a retention lock of one of the first or second snapshots, the inherited retention lock having a retention expiration date later than a retention expiration date of another of the first or second snapshots.

In another embodiment, the snapshot is a first snapshot, is of a first directory of the file system, and the method further comprises: after the retention lock of the first snapshot has expired, receiving a request to delete the first snapshot; determining that there exists a second snapshot of a second directory of the file system, the second directory being a child directory of the first directory, and the second snapshot having a retention lock that has not expired; and blocking the request to delete the first snapshot.

In an embodiment, the applying a retention lock comprises: setting in metadata of the snapshot a flag indicating that the snapshot is retention-locked for the retention duration.

In another embodiment, there is a system for indirectly protecting files comprising: a processor; and memory configured to store one or more sequences of instructions which, when executed by the processor, cause the processor to carry out the steps of: taking a snapshot of at least a portion of a file system comprising a plurality of files to retain over a retention duration, the snapshot being at a level of the file system or a directory of the file system; applying a retention lock to the snapshot to block, over the retention duration, operations involving deletion of the snapshot; and not applying the retention lock to the plurality of files.

In another embodiment, there is a computer program product, comprising a non-transitory computer-readable medium having a computer-readable program code embodied therein, the computer-readable program code adapted to be executed by one or more processors to implement a method for indirectly protecting files comprising: taking a snapshot of at least a portion of a file system comprising a plurality of files to retain over a retention duration, the snapshot being at a level of the file system or a directory of the file system; applying a retention lock to the snapshot to block, over the retention duration, operations involving deletion of the snapshot; and not applying the retention lock to the plurality of files.

In another embodiment, there is a method comprising: taking a snapshot of at least a directory of a file system, the directory comprising a plurality of files; applying a retention lock to the snapshot to block, over a retention duration of the retention lock, operations involving deletion of the snapshot; and not applying the retention lock to the plurality of files thereby allowing the plurality of files to be deleted, wherein the applying the retention lock comprises: when the directory is a child directory of a parent directory of which a snapshot has been taken, inheriting a retention lock applied to the snapshot of the parent directory, when the directory is a child directory of two or more parent directories of which a snapshot of each of the two or more parent directories have been taken, inheriting a retention lock applied to a snapshot of the two or more parent directories, wherein the retention lock applied to the snapshot of the two or more parent directories that is inherited has a retention duration greater than a retention duration of a retention lock applied to each other snapshot of the two or more parent directories, and when the directory is a child directory of a parent directory of which a plurality of snapshots have been taken, inheriting a retention lock applied to a snapshot of the plurality of snapshots, wherein the retention lock applied to the snapshot of the plurality of snapshots that is inherited has a retention expiration date later than a retention expiration date of a retention lock applied to each other snapshot of the plurality of snapshots.

Figure 9:
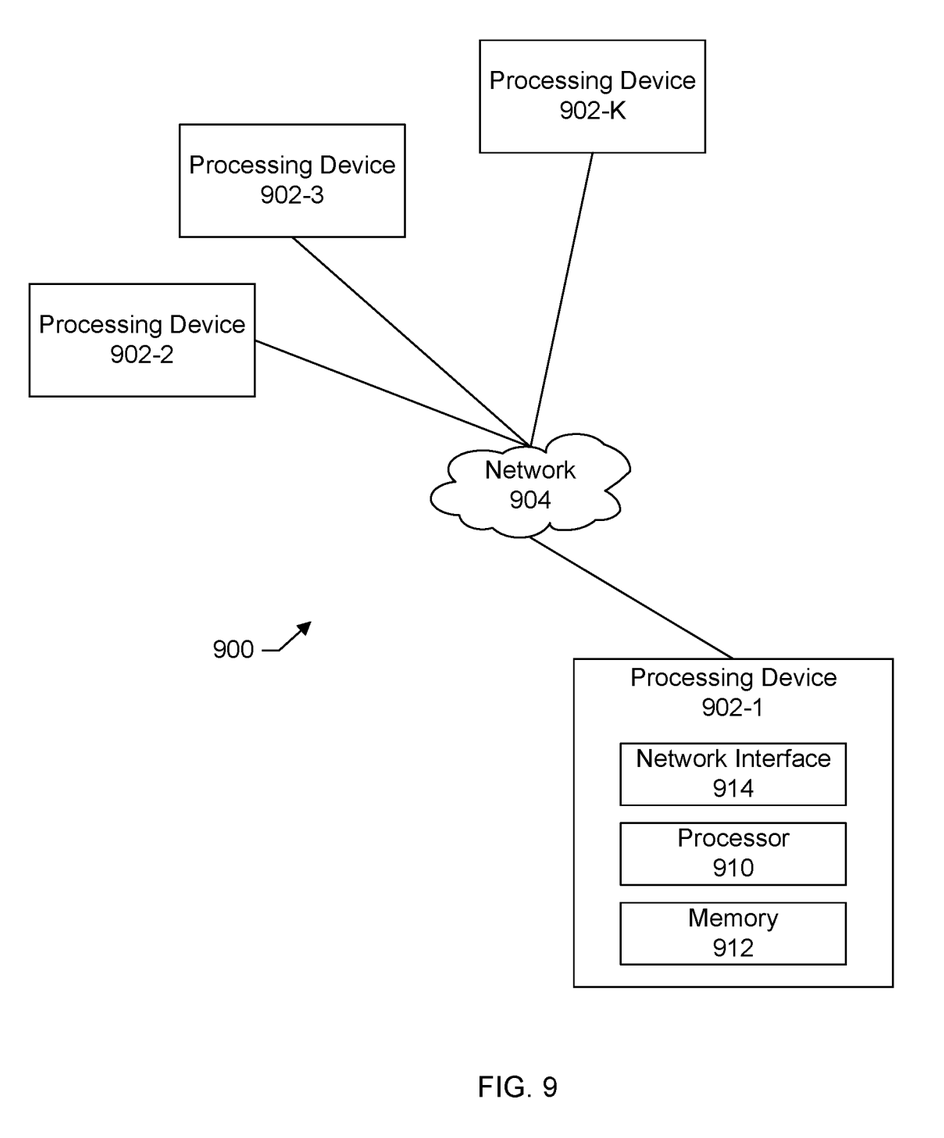
FIG. 9 shows a block diagram of a processing platform that may be utilized to implement at least a portion of an information processing system, according to one or more embodiments.

FIG. 9 shows an example of a processing platform 900 that may include at least a portion of the information handling system shown in FIG. 1. The example shown in FIG. 9 includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines.

Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 10:
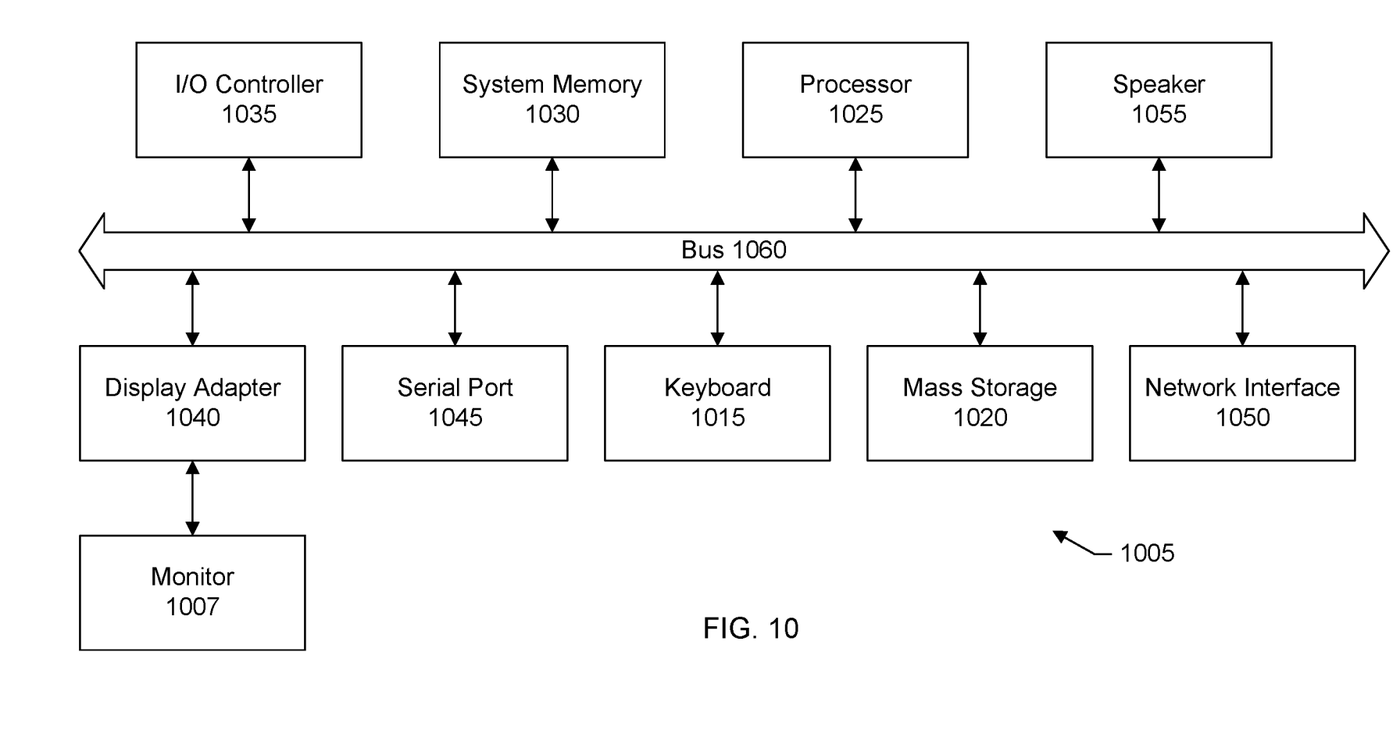
FIG. 10 shows a block diagram of a computer system suitable for use with the system, according to one or more embodiments.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, interne, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of indirectly protecting files comprising:
periodically closing an air gap between a primary backup storage system and a vault storage system;
upon the air gap being closed, replicating at least a portion of a file system comprising a plurality of files to retain over a retention duration from the primary backup storage system to the vault storage system; and
after replication of the files to the vault storage system, taking a snapshot of the files at the vault storage system, the snapshot being at a level of the file system or a directory of the file system; and
applying a retention lock to the snapshot at the vault storage system to block, over the retention duration, operations involving deletion of the snapshot, but not applying the retention lock to the files, the files at the vault storage system thereby remaining unlocked.

2. The method of claim 1 wherein the snapshot is a first snapshot, is of a first directory of the file system, and the method further comprises:
taking a second snapshot of a second directory of the file system, the second directory being a child directory of the first directory, the first directory thereby being a parent directory; and
inheriting, by the second snapshot, the retention lock applied to the first snapshot.

3. The method of claim 1 wherein the snapshot is a first snapshot, is of a first directory of the file system, the retention lock is a first retention lock, and the method further comprises:

taking a second snapshot of a second directory of the filesystem, the second directory being a parent directory of the first directory;
applying a second retention lock to the second snapshot;
taking a third snapshot of a third directory of the file system, the third directory being a child directory of the first directory; and
inheriting, by the third snapshot, a retention lock applied to one of the first or second snapshots, the inherited retention lock having a retention duration greater than a retention duration of another of the first or second snapshots.

4. The method of claim 1 wherein the snapshot is a first snapshot, is of a first directory of the file system, the retention lock is a first retention lock, and the method further comprises:
taking a second snapshot of the first directory;
applying a second retention lock to the second snapshot;
taking a third snapshot of a second directory of the file system, the second directory being a child directory of the first directory; and
inheriting, by the third snapshot, a retention lock of one of the first or second snapshots, the inherited retention lock having a retention expiration date later than a retention expiration date of another of the first or second snapshots.

5. The method of claim 1 wherein the snapshot is a first snapshot, is of a first directory of the file system, and the method further comprises:
after the retention lock of the first snapshot has expired, receiving a request to delete the first snapshot;
determining that there exists a second snapshot of a second directory of the file system, the second directory being a child directory of the first directory, and the second snapshot having a retention lock that has not expired; and
blocking the request to delete the first snapshot.

6. The method of claim 1 wherein the applying a retention lock comprises:
setting in metadata of the snapshot a flag indicating that the snapshot is retention-locked for the retention duration.

7. The method of claim 1 wherein the vault storage system comprises security credentials separate from the primary backup storage system.

8. The method of claim 1 further comprising:
receiving a request to modify the retention lock applied to the snapshot at the vault storage system;
determining whether the request is to shorten an expiration date of the retention lock or extend the expiration date;
if the request is to shorten the expiration date, denying the request; and
if the request is to extend the expiration date, allowing the request.

9. A system for indirectly protecting files comprising: a processor; and memory configured to store one or more sequences of instructions which, when executed by the processor, cause the processor to carry out the steps of:
periodically closing an air gap between a primary backup storage system and a vault storage system;
upon the air gap being closed, replicating at least a portion of a file system comprising a plurality of files to retain over a retention duration from the primary backup storage system to the vault storage system; and
after replication of the files to the vault storage system, taking a snapshot of the files at the vault storage system, the snapshot being at a level of the file system or a directory of the file system; and
applying a retention lock to the snapshot at the vault storage system to block, over the retention duration, operations involving deletion of the snapshot, but not applying the retention lock to the files, the files at the vault storage system thereby remaining unlocked.

10. The system of claim 9 wherein the snapshot is a first snapshot, is of a first directory of the file system, and the processor further carries out the steps of:
taking a second snapshot of a second directory of the file system, the second directory being a child directory of the first directory, the first directory thereby being a parent directory; and
inheriting, by the second snapshot, the retention lock applied to the first snapshot.

11. The system of claim 9 wherein the snapshot is a first snapshot, is of a first directory of the file system, the retention lock is a first retention lock, and the processor further carries out the steps of:
taking a second snapshot of a second directory of the filesystem, the second directory being a parent directory of the first directory;
applying a second retention lock to the second snapshot;
taking a third snapshot of a third directory of the file system, the third directory being a child directory of the first directory; and
inheriting, by the third snapshot, a retention lock applied to one of the first or second snapshots, the inherited retention lock having a retention duration greater than a retention duration of another of the first or second snapshots.

12. The system of claim 9 wherein the snapshot is a first snapshot, is of a first directory of the file system, the retention lock is a first retention lock, and the processor further carries out the steps of:
taking a second snapshot of the first directory;
applying a second retention lock to the second snapshot;
taking a third snapshot of a second directory of the file system, the second directory being a child directory of the first directory; and
inheriting, by the third snapshot, a retention lock of one of the first or second snapshots, the inherited retention lock having a retention expiration date later than a retention expiration date of another of the first or second snapshots.

13. The system of claim 9 wherein the snapshot is a first snapshot, is of a first directory of the file system, and the processor further carries out the steps of:
after the retention lock of the first snapshot has expired, receiving a request to delete the first snapshot;
determining that there exists a second snapshot of a second directory of the file system, the second directory being a child directory of the first directory, and the second snapshot having a retention lock that has not expired; and
blocking the request to delete the first snapshot.

14. The system of claim 9 wherein the applying a retention lock comprises:
setting in metadata of the snapshot a flag indicating that the snapshot is retention-locked for the retention duration.

15. A computer program product, comprising a non-transitory computer-readable medium having a computer-readable program code embodied therein, the computer-readable program code adapted to be executed by one or more processors to implement a method of indirectly protecting files comprising:
periodically closing an air gap between a primary backup storage system and a vault storage system;
upon the air gap being closed, replicating at least a portion of a file system comprising a plurality of files to retain over a retention duration from the primary backup storage system to the vault storage system; and
after replication of the files to the vault storage system, taking a snapshot of the files at the vault storage system, the snapshot being at a level of the file system or a directory of the file system; and
applying a retention lock to the snapshot at the vault storage system to block, over the retention duration, operations involving deletion of the snapshot, but not applying the retention lock to the files, the files at the vault storage system thereby remaining unlocked.

16. The computer program product of claim 15 wherein the snapshot is a first snapshot, is of a first directory of the file system, and the method further comprises:
taking a second snapshot of a second directory of the file system, the second directory being a child directory of the first directory, the first directory thereby being a parent directory; and
inheriting, by the second snapshot, the retention lock applied to the first snapshot.

17. The computer program product of claim 15 wherein the snapshot is a first snapshot, is of a first directory of the file system, the retention lock is a first retention lock, and the method further comprises:
taking a second snapshot of a second directory of the filesystem, the second directory being a parent directory of the first directory;
applying a second retention lock to the second snapshot;
taking a third snapshot of a third directory of the file system, the third directory being a child directory of the first directory; and
inheriting, by the third snapshot, a retention lock applied to one of the first or second snapshots, the inherited retention lock having a retention duration greater than a retention duration of another of the first or second snapshots.

18. The computer program product of claim 15 wherein the snapshot is a first snapshot, is of a first directory of the file system, the retention lock is a first retention lock, and the method further comprises:
taking a second snapshot of the first directory;
applying a second retention lock to the second snapshot;
taking a third snapshot of a second directory of the file system, the second directory being a child directory of the first directory; and
inheriting, by the third snapshot, a retention lock of one of the first or second snapshots, the inherited retention lock having a retention expiration date later than a retention expiration date of another of the first or second snapshots.

19. The computer program product of claim 15 wherein the snapshot is a first snapshot, is of a first directory of the file system, and the method further comprises:
after the retention lock of the first snapshot has expired, receiving a request to delete the first snapshot;
determining that there exists a second snapshot of a second directory of the file system, the second directory being a child directory of the first directory, and the second snapshot having a retention lock that has not expired; and
blocking the request to delete the first snapshot.

20. The computer program product of claim 15 wherein the applying a retention lock comprises:
setting in metadata of the snapshot a flag indicating that the snapshot is retention-locked for the retention duration.

* * * * *